(12) United States Patent
Becker

(10) Patent No.: US 7,480,537 B2
(45) Date of Patent: Jan. 20, 2009

(54) METHOD AND APPARATUS FOR COMPACT DISCS FOR SUBTLE DURATION MARKING

(75) Inventor: Craig Henry Becker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 852 days.

(21) Appl. No.: 10/697,920

(22) Filed: Oct. 30, 2003

(65) Prior Publication Data

US 2005/0096763 A1  May 5, 2005

(51) Int. Cl.
*G06F 17/00* (2006.01)
*G04C 23/00* (2006.01)
(52) U.S. Cl. .............................. 700/94; 368/10; 368/73
(58) Field of Classification Search ................ 368/73, 368/109, 274; 715/963; 360/12
See application file for complete search history.

(56) References Cited

U.S. PATENT DOCUMENTS

| | | | | |
|---|---|---|---|---|
| 5,662,117 A | | 9/1997 | Bittman ...................... 128/732 |
| 5,761,525 A | * | 6/1998 | Williams .................... 715/203 |
| 6,483,782 B1 | * | 11/2002 | Steinbach ...................... 369/6 |
| 6,910,038 B1 | * | 6/2005 | James ........................... 707/7 |
| 2003/0151618 A1 | * | 8/2003 | Johnson et al. ............. 345/716 |
| 2003/0159150 A1 | | 8/2003 | Chernock et al. ............. 725/58 |
| 2004/0019396 A1 | * | 1/2004 | McMahon et al. ............ 700/94 |

FOREIGN PATENT DOCUMENTS

| | | |
|---|---|---|
| JP | 9301469 | 11/1997 |
| JP | 2002198818 | 7/2002 |

OTHER PUBLICATIONS

Bharati, Meditation and Self-Awareness CDs, http://swamij.com/cd-timer.htm, retrieved from http://web.archive.org/ as it appeared on Oct. 22, 2002.*
Calendar—Definition from the Merriam-Webster's Collegiate Dictionary, 10th ed., 1999, 2 pages.*

* cited by examiner

*Primary Examiner*—Suhan Ni
*Assistant Examiner*—Joseph Saunders, Jr.
(74) *Attorney, Agent, or Firm*—Duke W. Yee; Justin M. Dillon; Wayne P. Bailey

(57) ABSTRACT

The present invention provides a method, apparatus, and computer instructions for indicating an end of a session. An identification of a session is received from a data structure containing a schedule. In response to receiving the identification of the session, an audio file is created on a storage medium. In the illustrative examples, the storage medium is an optical disc. A track is created for the optical disc on which the file is located. The audio file has a length equal to a length of the session. The audio file includes a silent segment followed by an audio segment. The audio segment provides an indication of the end of the session when encountered during playing of the audio file.

12 Claims, 2 Drawing Sheets

METHOD AND APPARATUS FOR COMPACT DISCS FOR SUBTLE DURATION MARKING

BACKGROUND OF THE INVENTION

1. Technical Field

The present invention relates generally to an improved data processing system and in particular to a method and apparatus for creating optical discs. Still more particularly, the present invention relates to a method, apparatus, and computer instructions for creating an optical disc having a mechanism for subtly indicating the passage of time.

2. Description of Related Art

Professionals often have schedules for meetings with clients others on a daily basis. Often times, multiple meetings may be scheduled in a single day. These meetings take place one after another in many instances. Looking at one's schedule or at the clock may not be possible or polite in many cases.

Also, many professionals provide services in fixed blocks of time. For example, psychiatrists, marriage counselors, and other mental health care professionals tend to provide an "n minute therapeutic hour" in which n is a fixed amount of time. These times may be, for example, 45 minutes, 50 minutes, or 60 minutes. Additionally, different sessions or meetings with clients or patients during a day may vary length. One meeting may be 45 minutes, while another meeting may be 60 minutes.

Currently, many of these professionals gauge time by looking at a clock to determine when a session has ended. This "clock-watching" tends to make clients nervous and may interfere with a client counselor relationship. Having a counselor or professional glancing at a clock behind the client or at their wrist watch may make the client suspect that the counselor is not really interested in the problems, issues, or other situations that are important to the client. Instead, the client may believe that the counselor is simply marking time until the end of the session when the counselor says "good bye" and starts a new session with another client. This type of tension does not allow for a full and efficient use of time by the client. For example, the client may be unable to trust that the counselor is really interested in helping the client solve a problem or issue. As a result, the client may not fully explain the problem or issue, and more time is required later to solve the problem or issue.

Therefore, it would be advantageous to have an improved method for providing a subtle reminder of when a session has concluded.

SUMMARY OF THE INVENTION

The present invention provides a method, apparatus, and computer instructions for indicating an end of a session. An identification of a session is received from a data structure containing a schedule. In response to receiving the identification of the session, an audio file is created on a storage medium. In the illustrative examples, the storage medium is an optical disc. A track is created for the optical disc on which the file is located. The audio file has a length equal to a length of the session. The audio file includes a silent segment followed by an audio segment. The audio segment provides an indication of the end of the session when encountered during playing of the audio file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
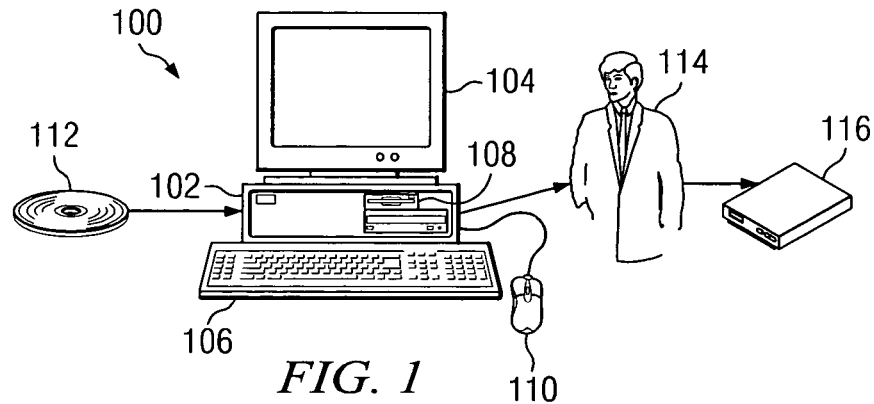
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y.

The present invention provides a method, apparatus, and computer instructions for indicating the end of a session in a subtle manner. The mechanism of the present invention employs an optical disc, such as compact disc (CD) 112, on which a track is recorded for a session. The session in this example is one provided by a professional. In the illustrative examples, these discs also may be, for example, a digital versatile disc (DVD).

The optical disc is created for a session having a fixed length duration. In this example, an audio file is created for a session on CD 112 using data processing system 100. The audio file is stored or placed on a track on CD 112. In particular, CD 112 is a writeable CD on which a track includes a block of silence followed by an audio block containing an indictor to indicate the end of the session. This CD may then be employed by user 114 during a session with a client. User 114 may play CD 112 in CD player 116. The block of silence plays for most of the session with the audio player in the audio block being presented near the end of the session. In this manner, user 114 may focus attention on the client without causing any discomfort or tension that may occur from continually looking at a clock.

In one illustrative example, the session is a 60 minute session. As a result, the track written on CD 112 is a 60 minute track. With this length of time, the track may include a 59 minute block of silence followed by an audio block of one minute, indicating that the session is about to end. This indicator in the audio block may be, for example, a gentle swell of tasteful music such as light jazz or some lesser known Bach or Mozart music. The length of time for a session may vary depending on the client or on the services rendered by the professional.

Another advantage of the mechanism of the present invention is that, CD 112 may be played on CD player 116 that is part of a sound system at the professional's location, such as an office. Data processing system 100 is not required to play CD 112. The sound system may be, for example, a portable radio player with a CD capability or a stereo system containing a CD player. The optical disc, CD 112, is also referred to as a session duration optical disc. This disc is placed into the player when the session begins, to play the recorded track. When a single minute is left, the music or other audio indicator is presented by the sound system. Of course, other session lengths other than 60 minutes may be used, such as 15 minutes, 30 minutes, 45 minutes, or 50 minutes.

Further, the length of the block of silence and the length of the block containing the audio indicator may vary depending on the particular implementation. For example, in a 60 minute session, a 57 minute block of silence may be followed by a one minute block containing the audio indicator.

Additionally, the optical discs or storage devices may be packaged or sold as sets containing a variety of durations and possibly with different musical or audio themes. In this manner, a user may purchase discs, rather than have to create them. Further, these optical discs may be DVDs, rather than CDs, to provide for longer durations. Depending on the particular implementation, a storage medium, such as an audio tape or a memory storage device containing a flash memory may be used in place of an optical disc. Flash memory storage devices include, for example, compact flash smart media, a memory stick, or a secure digital (SD) memory card.

Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
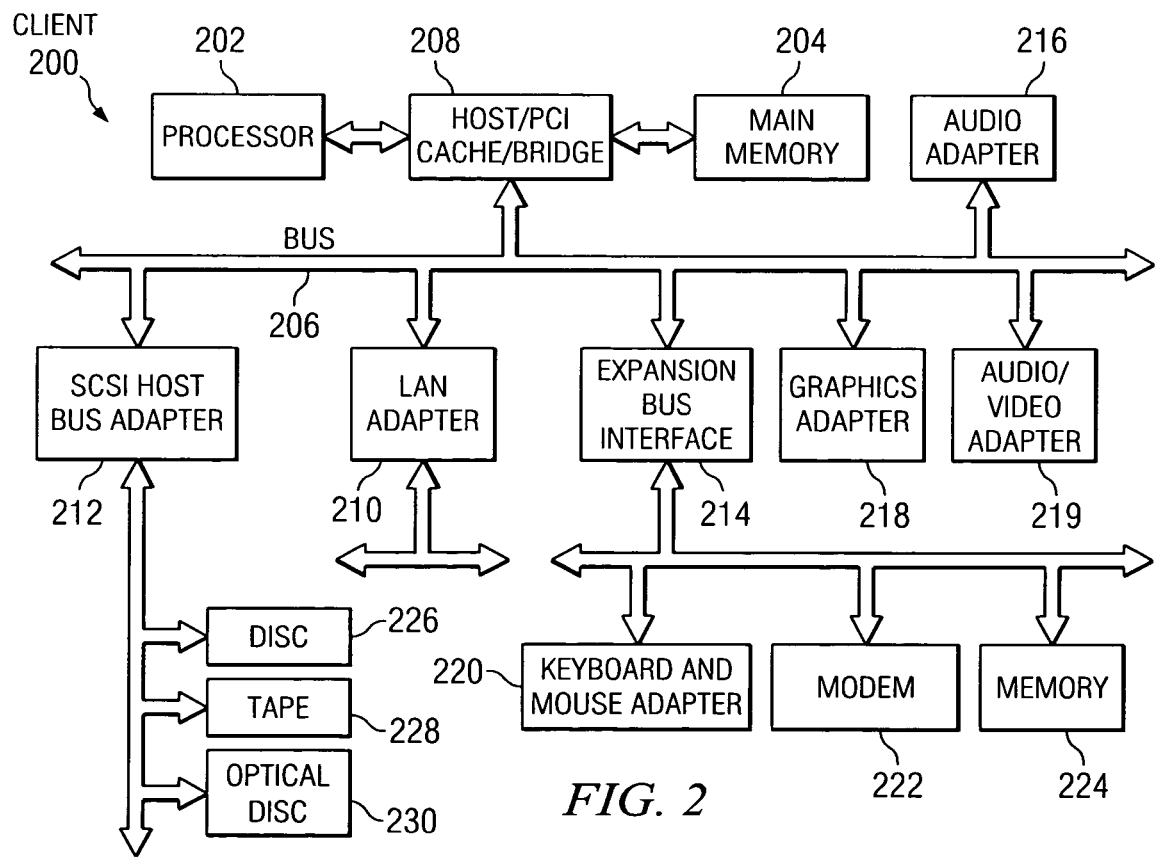
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. Main memory 204 may include processes and instructions for selecting tracks and creating optical discs with the tracks of the present invention. Additionally, this memory also may include processes and instructions a scheduling program. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disc drive 226, tape drive 228, and optical disc drive 230.

The mechanism of the present invention uses optical disc drive 230 to generate tracks with an appropriate length for a session on an optical disc, such as a CD or a DVD. This track includes a block of silence followed by a audio block in which the length of the block of silence and the audio block equals the length of the session. This optical disc may now be played by the user on a different system.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disc drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disc drives and the like, may be used in addition to or in place of the hardware depicted in FIG. 2. Also, the processes of the present invention may be applied to a multiprocessor data processing system.

In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data. As a PDA, data processing system 200 includes a connection to an optical disc drive.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. Such an implementation allows a user to create session duration optical discs from a kiosk that may be located in a public place.

The processes of the present invention are performed by processor 202 using computer implemented instructions, which may be located in a memory such as, for example, main memory 204, memory 224, or in one or more peripheral devices 226-230.

Figure 3:
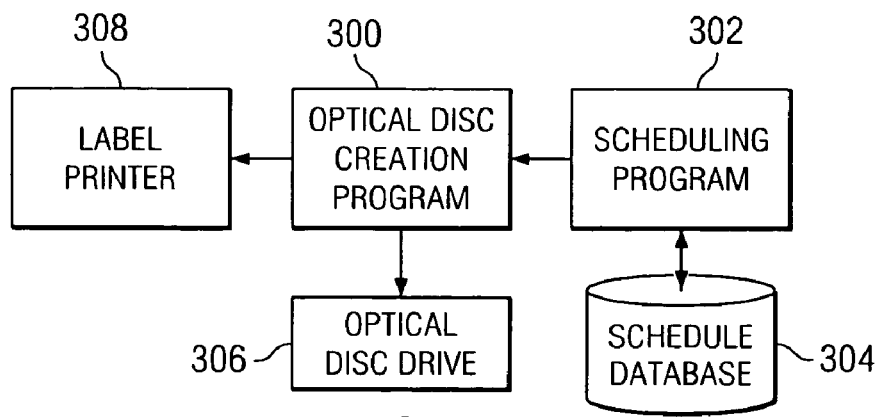
FIG. 3 is components used in generating a session duration optical disc in accordance with a preferred embodiments of the present invention.

Turning now to FIG. 3, components used in generating a session duration optical disc is depicted in accordance with a preferred embodiment of the present invention. In this illustrative example, optical disc creation program 300 is used to create an optical disc, such as a CD-R or CD-RW. Additionally, a optical disc creation program may be used to generate a DVD, such as a DVD−R, DVD+R, DVD−RW, or DVD+RW.

Optical disc creation program 300 identifies the session duration. This session duration may be, for example, 30 minutes, 45 minutes, 60 minutes, or 110 minutes. The duration of the session may be input by a user or obtained from a default value. Further, this session duration may be obtained from a schedule or appointment database, such as through scheduling program 302 and schedule database 304.

A segment or block of silence is identified for the session duration and the segment or block containing the audio indicator is selected such that both of these segments or blocks fill the entire session. For example, a 60 minute session may include a 59 minute block of silence followed by a 1 minute block containing the audio indicator. Alternatively, the block containing the audio indicator may last for 2 minutes with the block of silence lasting for 58 minutes in a 60 minute session. This information is used to record or create a track on an optical disc in optical disc drive 306. Further, the block of silence may be 59 minutes and 30 seconds with the audio block lasting only 30 seconds. In these illustrative examples, the length and selection of the audio block may be set by default or through a user selection. Further, user preferences may dictate the use of different selections or lengths for the audio block. For example, music by Mozart may be avoided for use in an audio block for a particular patient, while this music may be acceptable for a different patient. As a result, two different tracks may be generated to take into account the preferences of these two patients.

Label printer 308 is used to generate a label for the optical disc. This label may include information, such as the session duration for the particular optical disc. If multiple session durations are recorded on the optical disc by optical disc drive 306, label printer 308 may print a label identifying each track with the session duration. The label also may include additional information, such as the name of the doctor in the event that discs are created for different doctors in an office. Further, dates may be included if discs are created for meetings or appointments for multiple days or for an entire week.

Further, optical disc creation program 300 may receive a number of different session durations for a user. These session durations may be, for example, for appointments or sessions during a single day. This information may be obtained from scheduling program 302. Scheduling program 302 is employed to schedule sessions and store information within schedule database 304. In the illustrative examples, scheduling program 302 may take various forms, such as, for example, Microsoft Outlook, which is available from Microsoft Corporation, or some other calendar or appointment program.

This appointment or schedule information may be sent to or retrieved by optical disc creation program 300 to create one or more optical discs for sessions or appointments for one or more days. In this instance, label printer 308 may generate labels with identification information for sessions or appointments. These labels may be placed on optical discs created through optical disc drive 306. Each of these labels may identify the time of the appointment, as well as the duration of the session. Further, other information may be printed on the label identifying the client. In this manner, the user may select a particular track for a session. With these optical discs, the user may take those discs and use them at different locations.

Additionally, the information regarding session durations and identifications may be sent to another data processing system, such as a personal digital assistant "PDA" so that the user may have an identification of the particular disc required for a particular session. For example, the user may have a set of standard session duration CDs for different durations, such as 15 minutes, 30 minutes, 45 minutes, 60 minutes, and one hour and 10 minutes. The scheduling information may identify which optical disc to use for a particular appointment in the case that sessions of different durations may be scheduled. With the limited storage space on CDs, media with greater storage casting may be desired for meetings throughout the entire day. For example, a DVD may be used in place of a CD to store tracks for appointments during the day. Additionally, the audio data may be compressed to place more tracks for sessions throughout a day. For example, the audio data may be compressed into MP3 audio files, rather than using uncompressed audio files, such that less space is required.

Figure 4:
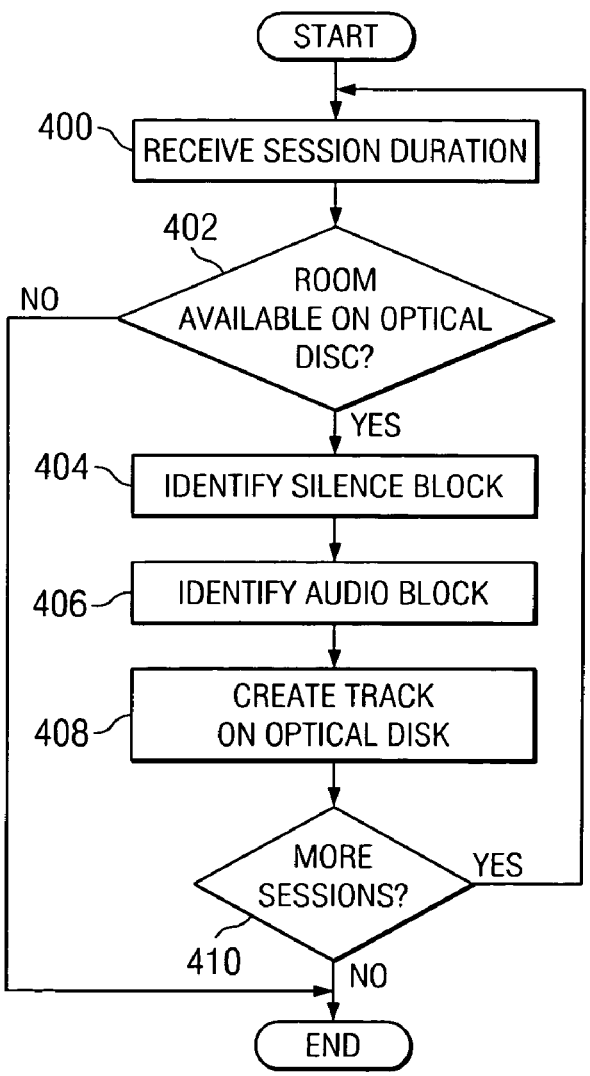
FIG. 4 is a flowchart for the process for generating a session duration optical disc in accordance with a preferred embodiment of the present invention.

Turning now to FIG. 4, a flowchart for the process for generating a session duration optical disc is depicted in accordance with a preferred embodiment of the present invention. The process illustrated in FIG. 4 may be implemented in a optical disc creation program, such as optical disc creation program 300 in FIG. 3.

The process begins by receiving a session duration (step 400). The session duration may be obtained in a number of different ways. For example, the user may input the session duration or the session duration may be obtained from a scheduling program. Thereafter, a determination is made as to whether room is available on the optical disc for the session duration (step 402). Depending on the optical media, the session duration may be too long or the amount of room left on the optical media may be insufficient to record a track for this amount of time.

If sufficient room is available on the optical disc for the session duration, a silence block is identified (step 404). The silence block may be identified based on a user input or based on some default or pre selected parameter. Thereafter, the audio block is identified (step 406). The identification of the audio block includes identifying the duration as well as the content for the audio block. The user may have some preselected music or other audio indication that is to be used for the audio block. Both the silence block and the audio block added together have a time duration equal to the session duration received in step 400.

Thereafter, a track is created on the optical disc for the session duration (step 408). A determination is then made as to whether additional sessions are present for processing (step 410). These additional sessions may be defined through a user input or from information obtained through a scheduling program, such as, for example, a calendar program. The sessions may be those for a selected period of time, such as one day or an entire week.

If the additional sessions are not present, the process terminates. Otherwise, the process returns to step 400 to receive another session duration. With reference again step 402, if room is unavailable on the optical disc, the process terminates.

Thus, the present invention provides an improved method, apparatus, and computer instructions for generating an optical disc containing a session duration for use in indicating when a session has ended or terminated. The mechanism of the present invention involves creating a track on an optical disc with a block of silence as well as with an audio block. The block of silence is followed by an audio block containing an audio indicator, such as music. This music indicates the session is about to end or has ended. Although he illustrative embodiments use music as the audio indicator, other types of audio indicators may be used. For example, the audio indicator may be a voice saying "time for your 3 p.m. meeting". Additionally, other types of media may be used to provide session duration indication, such as a flash memory.

In this manner, a professional, such as a psychiatrist or marriage counselor, may provide services to patients without having to divert their attention away from the patient to check a clock. As a result, patients are less likely to think that the professional is uninterested in the patient. This mechanism may be applied by other types of professionals in addition to health care providers such as teachers, tutors, or coaches.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for indicating an end of a session, the method comprising:
   receiving an identification of the session and a duration of the session from a data structure containing a schedule of a date and time for each of a plurality of user sessions, wherein the data structure is a file for a calendar program that is installed on the data processing system and operable for calendaring the plurality of user sessions; and
   responsive to receiving the identification of the session and the duration of the session, creating an audio file on a storage medium, wherein the audio file has a length equal to the duration of the session, wherein the audio file includes a silent segment followed by an audio segment and wherein the audio segment provides an indication of the end of the session when encountered during playing of the audio file, wherein a plurality of audio files are created on the storage medium in which each audio file corresponds to a given user session for a particular user according to the schedule of the plurality of user sessions.

2. The method of claim 1, further comprising sending the identification of the session and the duration of the session to another data processing system.

3. The method of claim 1, wherein the storage medium is one of a compact disc, a digital versatile disc, a flash memory, or an audio tape.

4. The method of claim 1, wherein the audio segment is music.

5. The method of claim 1, wherein the silent segment is 59 minutes long and the audio segment is 1 minute long for a 60 minute session.

6. A data processing system for indicating an end of a session, the data processing system comprising:
   receiving means for receiving an identification of the session and a duration of the session from a data structure containing a schedule of a date and time for each of a plurality of user sessions, wherein the data structure is a file for a calendar program that is installed on the data processing system and operable for calendaring the plurality of user sessions; and
   creating means, responsive to receiving the identification of the session and the duration of the session, for creating an audio file on a storage medium, wherein the audio file has a length equal to the duration of the session, wherein the audio file includes a silent segment followed by an audio segment and wherein the audio segment provides an indication of the end of the session when encountered during playing of the audio file, wherein a plurality of audio files are created on the storage medium in which each audio file corresponds to a given user session for a particular user according to the schedule of the plurality of user sessions.

7. The data processing system of claim 6, further comprising sending means for sending the identification of the session and the duration of the session to another data processing system.

8. The data processing system of claim 6, wherein the storage medium is one of a compact disc, a digital versatile disc, a flash memory, or an audio tape.

9. The data processing system of claim 6, wherein the audio segment is music.

10. A computer program product encoded in a computer readable, recordable-type medium and operable by a data processing system for indicating an end of a session, the computer program product comprising:
    first instructions for receiving an identification of the session and a duration of the session from a data structure containing a schedule of a date and time for each of a plurality of user sessions, wherein the data structure is a file for a calendar program that is operable for calendaring the plurality of user sessions; and
    second instructions, responsive to receiving the identification of the schedule and the duration of the session, for creating an audio file on a storage medium, wherein the audio file has a length equal to the duration of the session, wherein the audio file includes a silent segment followed by an audio segment and wherein the audio segment provides an indication of the end of the session when encountered during playing of the audio file, wherein a plurality of audio files are created on the storage medium in which each audio file corresponds to a given user session for a particular user according to the schedule of the plurality of user sessions.

11. The computer program product of claim 10, further comprising third instructions for sending the identification of the session and the duration of the session to another data processing system.

12. The computer program product of claim 10, wherein the storage medium is one of a compact disc, a digital versatile disc, a flash memory, or an audio tape.

* * * * *